(12) United States Patent
Hung et al.

(10) Patent No.: US 6,386,655 B1
(45) Date of Patent: May 14, 2002

(54) DISC STORAGE DEVICE WITH SELF-ALIGNING SLOTS

(75) Inventors: Ronald Eugene Hung, Georgetown; Verlon Eugene Whitehead; Tod Alan Barrett, both of Austin, all of TX (US)

(73) Assignee: RGT Design, Incorporated, Georgetown, TX (US)

( * ) Notice: Subject to any disclaimer, the term of this patent is extended or adjusted under 35 U.S.C. 154(b) by 34 days.

(21) Appl. No.: 09/679,443

(22) Filed: Oct. 4, 2000

(51) Int. Cl.⁷ .............................................. A47B 81/06
(52) U.S. Cl. ..................................... 312/9.42; 312/9.14
(58) Field of Search ............................... 312/9.11, 9.14, 312/9.9, 9.12, 9.19, 9.41, 9.42, 9.64, 9.16, 9.17, 9.23, 9.24, 9.25, 9.34, 9.36, 9.37, 9.38, 9.58, 327, 328; 306/308.1; 211/40

(56) References Cited

U.S. PATENT DOCUMENTS

| | | | | |
|---|---|---|---|---|
| 896,637 A | * | 8/1908 | Herrman | 312/9.11 |
| 5,101,972 A | * | 4/1992 | Hunt et al. | 312/9.11 |
| 5,476,172 A | * | 12/1995 | Hunt et al. | 206/308.1 |
| 5,611,607 A | * | 3/1997 | Kuzara et al. | 312/9.14 |
| 5,782,361 A | * | 7/1998 | Kakizaki et al. | |
| 6,048,042 A | * | 4/2000 | Chan | 312/9.11 |

* cited by examiner

*Primary Examiner*—Janet M Wilkens
(74) *Attorney, Agent, or Firm*—Bracewell & Patterson, L.L.P.

(57) ABSTRACT

A compact disk storage device has a base and a hinged lid. The inner surfaces of the base and lid each contain arcuate ribs which are parallel to and equally spaced-apart from one another. Each pair of adjacent ribs defines a shallow groove. Each rib in the base has a height which varies along its length. The upper edges of the ribs located near the front edge of the base are generally pointed. The upper edges of the ribs located near the rear edge of the base are generally blunt and shorter than the ribs near the front edge. The lesser cross-sectional dimension of the ribs near the rear edge allows the disk to seat properly in the groove without hindering its alignment.

20 Claims, 10 Drawing Sheets

DISC STORAGE DEVICE WITH SELF-ALIGNING SLOTS

BACKGROUND OF THE INVENTION

1. Technical Field

This invention relates in general to disc storage devices and in particular to a compact disc media storage device with slots which automatically align the compact discs when they are inserted into the storage device.

2. Description of the Related Art

One type of prior art compact disc storage device has a hollow, semi-cylindrical base and hinged lid. When the lid is in a closed position, the storage device has a cylindrical appearance. The base and lid each contain a plurality of thin, short, arcuate ribs which follow the contour of their inner surfaces. The ribs are parallel to one another, evenly spaced-apart and uniform in height. Each rib located in the base has a corresponding rib in the lid directly above it so that a shallow groove is defined between each adjacent pair of ribs both in the base and in the lid. Each groove is designed to hold a single compact disc.

A disc may be loaded into the storage device by selecting one of the grooves in the base and inserting the outer edge of the compact disc between the forward edges of the ribs of the selected groove. The disc is then rolled in a rearward direction or dropped into the shallow groove. The disc is closely received between the ribs of the groove along its circumference and is properly seated when it abuts the rearward side of the inner surface of the base in the selected groove.

One problem with this type of storage device is the misalignment or improper seating of discs in the grooves. During insertion, a disc may cross-thread into an adjacent groove or be prevented from aligning into a single groove by adjacent ribs at the rearward portion of the base. If a disc is misaligned when the lid of the storage device is moved to the closed position, the disc could be damaged. To avoid this problem, discs must be carefully inserted between and parallel to the ribs. If the angle of insertion of a disc is not close to parallel during the entire insertion process, the disc may tend to cross-thread more than one groove. Thus, an improved compact disk storage device is needed.

SUMMARY OF THE INVENTION

The compact disc storage device of the invention has a base and a hinged lid. The inner surfaces of the base and lid each contain short arcuate ribs. The ribs are parallel to and equally spaced-apart from one another. Each pair of adjacent ribs defines a shallow groove. Each rib in the base has a height which varies along its length. The upper edges of the ribs located near the front edge of the base are generally pointed. The upper edges of the ribs located near the rear edge of the base are generally blunt and shorter than the ribs near the front edge.

Prior to insertion of a compact disc, the lid is opened and a groove in the base is selected. The outer edge of the disc is placed on the forward edge of the groove between the two ribs which define the groove. The disc is then rolled rearward into the groove and closely received by the adjacent pair of ribs. The ribs cause the disc to align and seat in the groove without cross-threading into an adjacent groove. The lesser cross-sectional dimension of the ribs near the rear edge allows the disc to seat properly in the groove without hindering its alignment.

The foregoing and other objects and advantages of the present invention will be apparent to those skilled in the art, in view of the following detailed description of the preferred embodiment of the present invention, taken in conjunction with the appended claims and the accompanying drawings.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
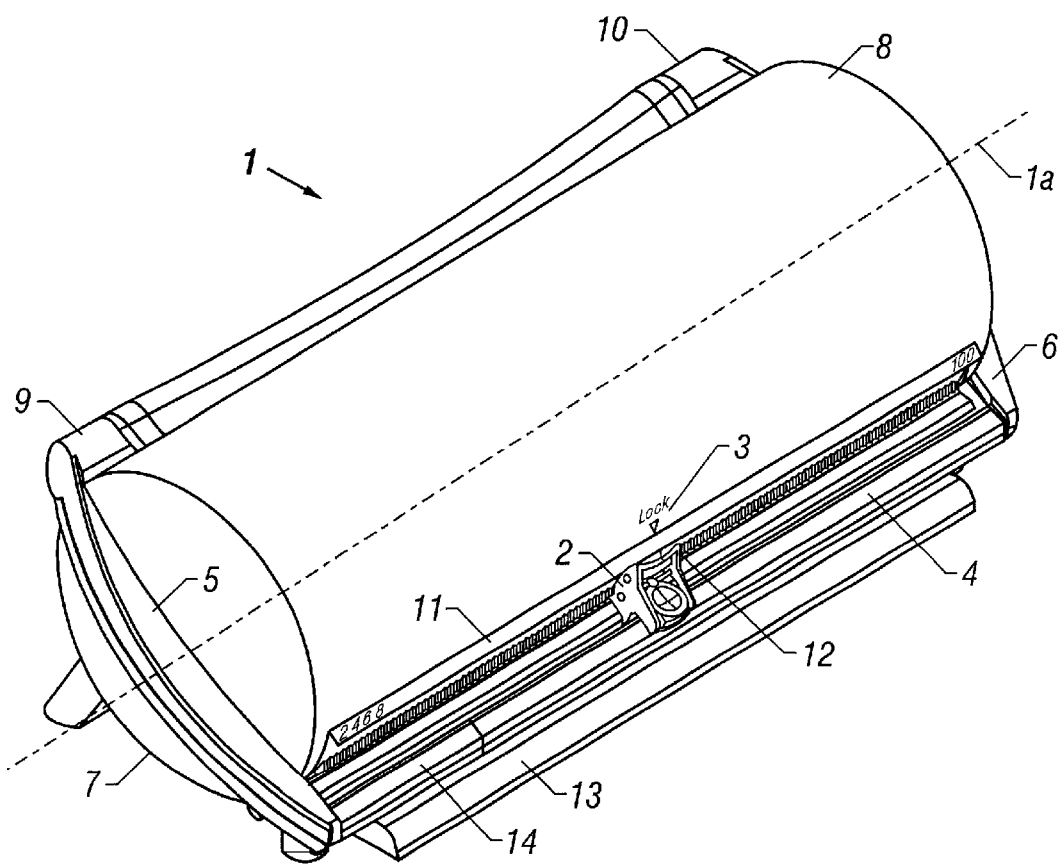
FIG. 1 is an isometric view of a compact disc storage device constructed in accordance with the invention and shown in a closed position.
Figure 2:
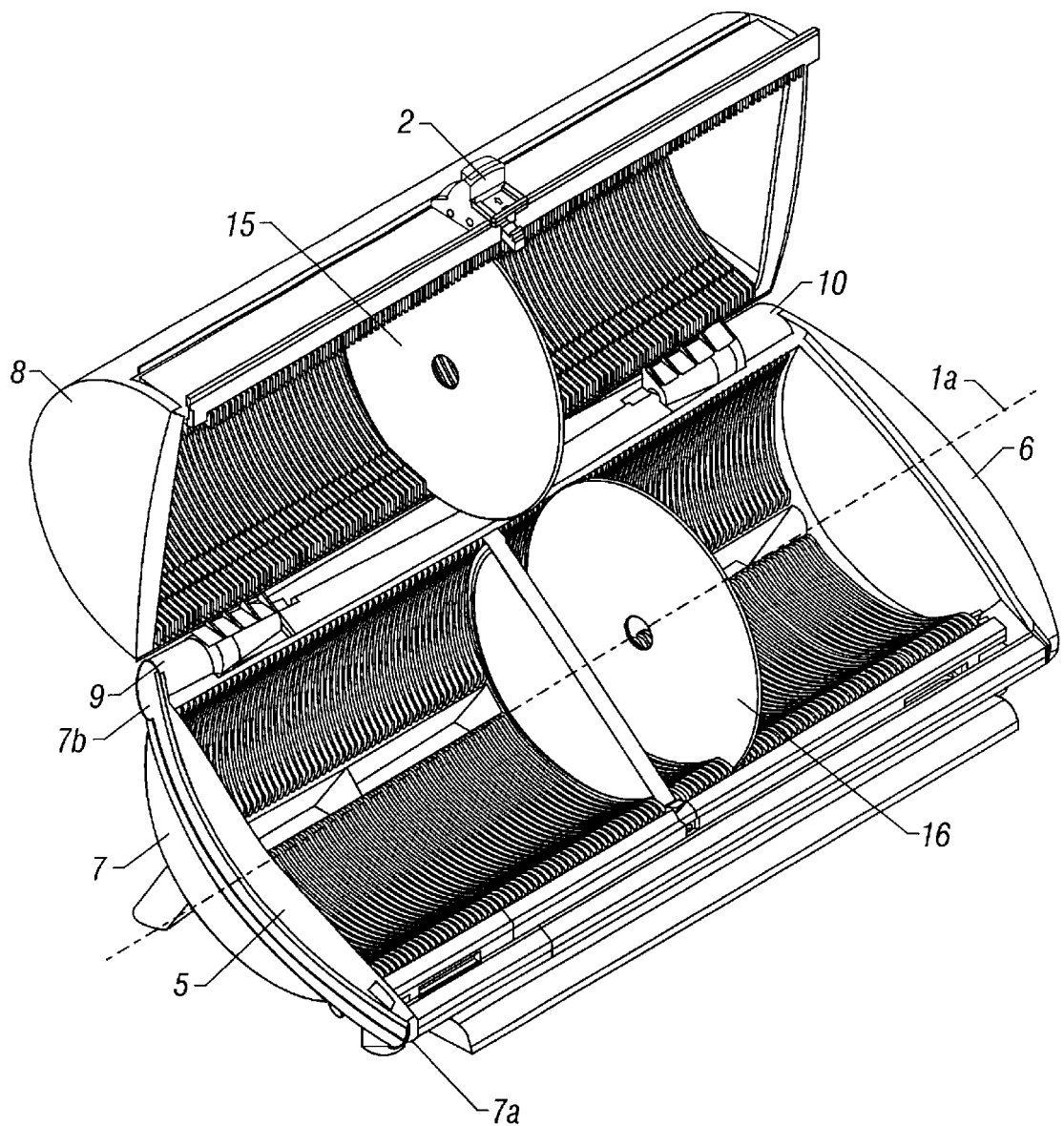
FIG. 2 is an isometric view of the compact disc storage device of FIG. 1 shown in an open position.

Referring to FIGS. 1 and 2, a compact disc (CD) media storage device 1 for housing compact discs (CDs) 15, 16 is shown. In the embodiment shown, device 1 is designed to store up to 100 CDs. When in a closed position (FIG. 1), device 1 has a generally cylindrical overall appearance with a longitudinal axis 1a. Device 1 has two semi-cylindrical halves, a bottom shell or base 7 and a top shell or lid 8, each of which has an opening with a concave interior surface. The opening in base 7 is generally upward-facing while the opening in lid 8 is generally downward-facing when in the closed position. Lid 8 is pivotable about its rearward edge on two hinges 9, 10 between the open and closed position.

The concave interior of base 7 extends slightly less than 180 degrees from front edge 7a to rear edge 7b. In the preferred embodiment, the interior of base 7 extends for a cylindrical span of approximately 170 degrees. Base 7 has front and rear legs on a lower side that maintain device 1 in an inclined configuration (see FIG. 4) relative to the horizontal support surface upon which device 1 sits. Ideally, the angle A should be in the range of 10 to 45 degrees so that front edge 7a of base 7 is at a lower elevation than rear edge 7b. Base 7 also has a pair of handles 5, 6 along its side edges.

Figure 3:
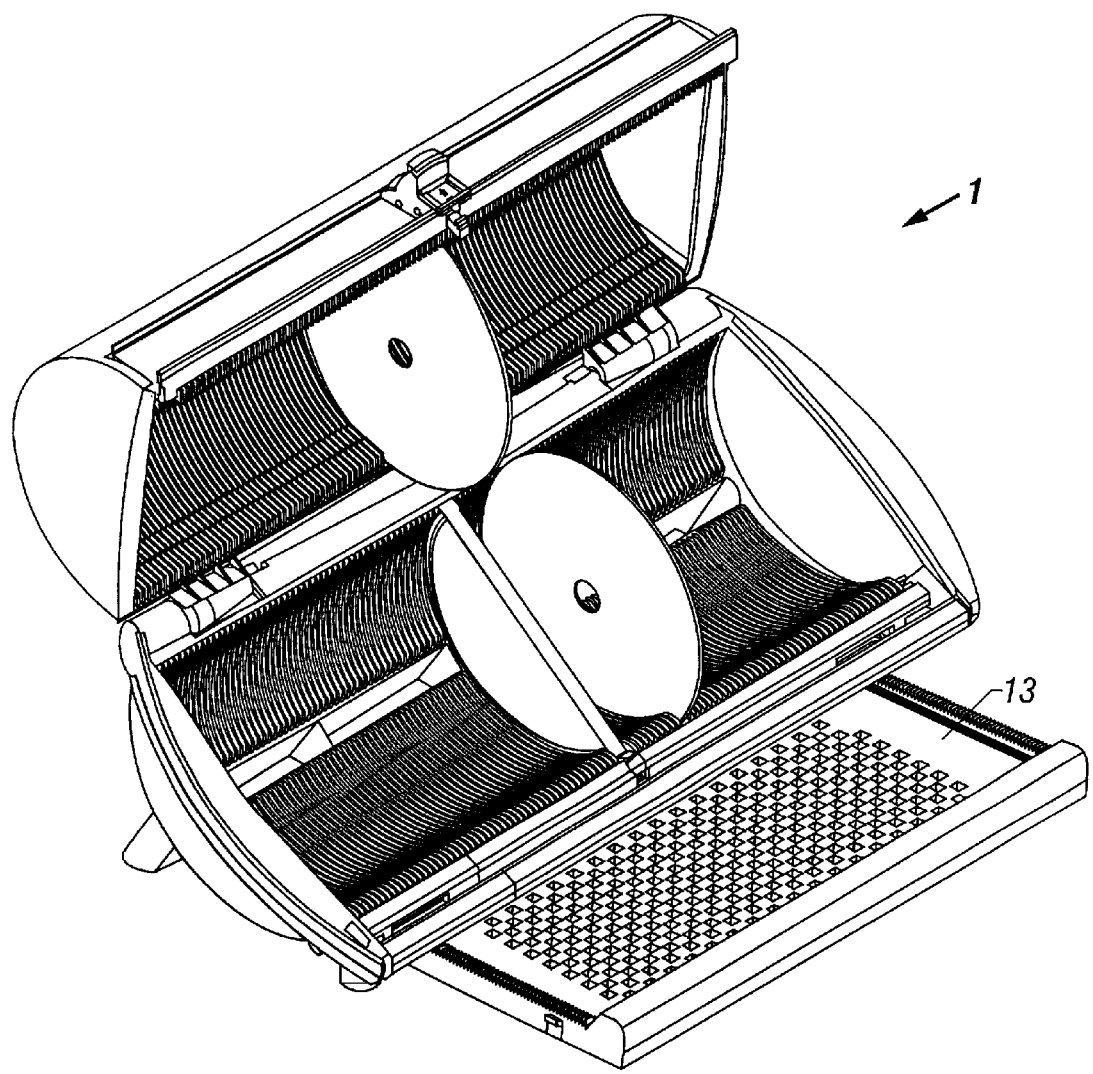
FIG. 3 is an isometric view of the compact disc storage device of FIG. 1 shown in an open position and with a title sheet tray in an open position.

Device 1 has a selector assembly 2 that is shown in a centrally-located locked position 3 in FIG. 1, and a top shell trip bail 4 for releasing lid 8 to the open position (FIG. 2). When selector assembly 2 is in locked position 3, the downward action of a top shell tip bail 4 is prevented. However, when selector assembly 2 is in any other position (e.g., to the left or right of locked position 3), top shell trip bail 4 may be moved downward to release lid 8. Selector assembly 2 is provided with an indicator line 12 which is used in conjunction with the numbered scale 11 on lid 8 to select one of the CDs located within device 1. Device 1 also has a movable title sheet tray 13 (FIG. 3) located beneath base 7. Title sheet tray 13 is shown without a title sheet which would lie on or be affixed to the top thereof. Title sheet tray 13 is movable between a is at retracted position (FIGS. 1 and 2), and an extended position (FIG. 3). As shown in FIG. 2, disk 15 is selected and held by actuator assembly 2, and disk 16 is stored in base 7. Up to 100 CDs can be stored as shown by CD 16.

Figure 4:
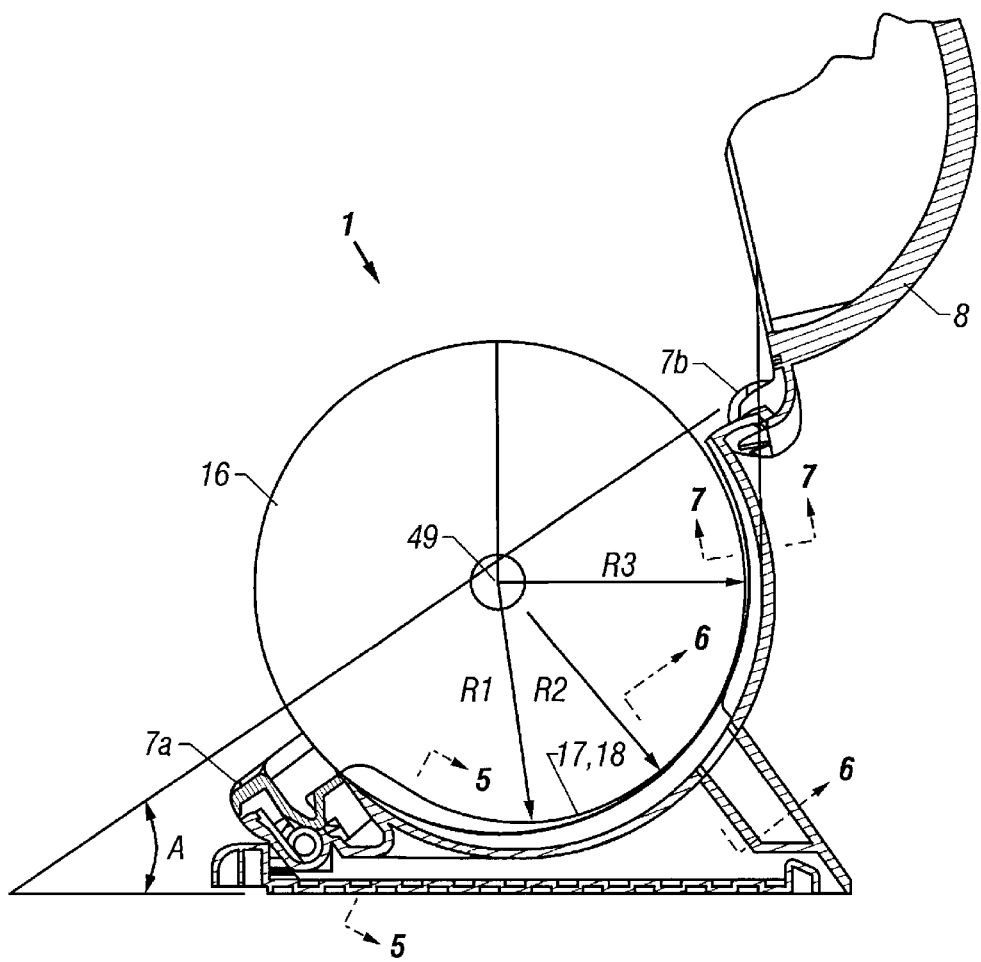
FIG. 4 is a sectional side view of the compact disc storage device of FIG. 1 in the open position of FIG. 2, and is shown with a compact disc inserted.

Referring now to FIG. 4, the inner surfaces of base 7 and lid 8 each contain a plurality of integrally formed, thin, short arcuate ribs 17, 18. Ribs 17, 18 are parallel to and equally spaced-apart from one another to define slots therebetween. Each rib extends along the inner surface of base 7 for at least 135 degrees. Each rib in base 7 has a corresponding rib in lid 8 which aligns directly above it. The ribs 17, 18 are perpendicular to axis 1a and extend radially inward. Each pair of adjacent ribs in base 7 and lid 8 defines a shallow groove.

Figure 5:
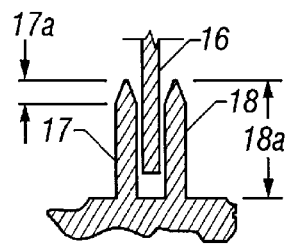
FIG. 5 is a sectional front view of a pair of adjacent ribs in the compact disc storage device of FIG. 4 taken along the line 5—5 of FIG. 4.
Figure 6:
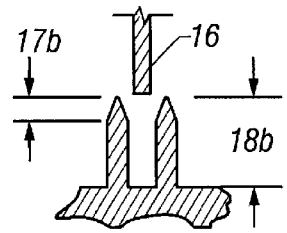
FIG. 6 is a sectional front view of the pair of ribs in the compact disc storage device of FIG. 4 taken along the line 6—6 of FIG. 4.
Figure 7:
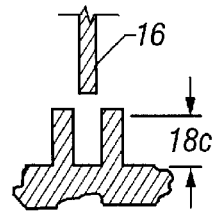
FIG. 7 is a sectional front view of the pair of ribs in the compact disc storage device of FIG. 4 taken along the line 7—7 of FIG. 4.

Referring to FIGS. 5–7, one of the improvements of the present invention is found in the cross-sectional shape of ribs 17,18. Each rib in base 7 has a cross-section with a depth or radial dimension which is not uniform throughout its arcuate length. The height or radial dimension of the ribs is less in the rearward portion adjacent to rear edge 7b than in the forward portion adjacent to front edge 7a. As shown in FIGS. 5–7, the ribs may be segmented into a taller forward portion with points formed by chamfers 17a on each side and a radial dimension 18a. As shown in FIG. 5, the forward portions of the ribs with dimension 18a extend for approximately 90 degrees rearward from front edge 7a. Dimension 18a is selected to be slightly less than the average blank margin on a CD 16, which is approximately 0.225 inches. The term "blank margin," as used herein, refers to the outer diametrical edge or periphery of a CD which does not contain recorded media. In this portion of base 7, CDs are closely aligned with their respective slots.

As shown in FIG. 6, the ribs taper down from front to rear such that the radial dimension 18b is smaller or shallower than dimension 18a. Thus, the radial dimension 18b of the ribs at section line 6—6 is less than their radial dimension 18a at section line 5—5. The tips of the ribs at section line 6—6 still have a chamfers 17b. This lesser rib height prevents an inserted CD from snagging on the slot until the CD is aligned enough to enter properly. As shown in FIG. 7, the portions of the ribs located closest to rearward edge 7b of base 7 have a square top with no chamfer. The ribs with square tops extend in the angular range of 45 to 90 degrees of base 7. The radial dimension 18c of the ribs at section line 7—7 is less than half of dimension 18a, and is approximately 0.100 inches. This lower height helps align the CD just as in section 6—6.

The tips of the ribs at section line 5—5, the lower edges of their chamfers 37, and the square tops of the ribs at section line 7—7 are circumscribed about a center point 49, with radii R1, R2 and R3, respectively. Thus, radius R1 extends to the highest tips, radius R2 extends to the lower ends of their chamfers, and R3 extends to the square tops at section line 7—7. The inner surface of base 17, which is the same surface defined by the slots between the ribs, is circumscribed from the same center point. Each rib in lid 8 is uniform in cross-section throughout its length and does not change in radial dimension.

Figure 8:
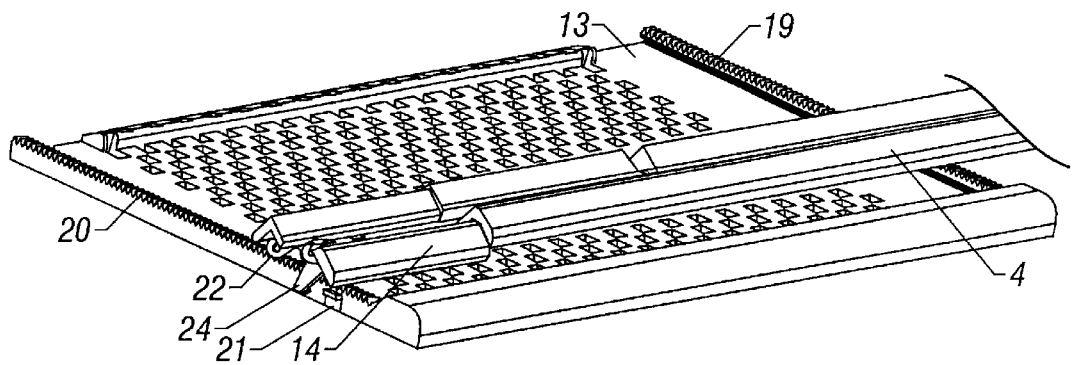
FIG. 8 is an isometric view of the title sheet tray of FIG. 3 and some of its latching mechanisms.
Figure 9:
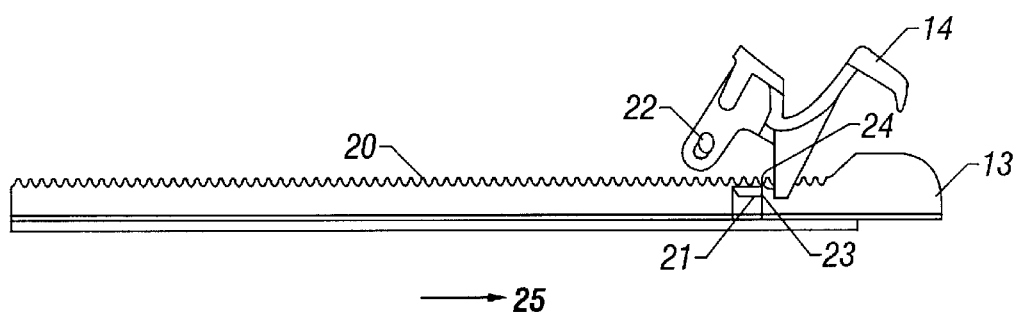
FIG. 9 is a side view of the title sheet tray and latching mechanisms of FIG. 8.

Referring now to FIGS. 8 and 9, title sheet tray 13 comprises a generally planar platform having a drive gear rack 19, 20 extending along each of its side edges. Each drive gear rack engages its own small pinion (not shown) rotatably mounted to the lower side of base 7. Title sheet tray 13 also has a small latch 21 that extends perpendicularly from the side thereof. Latch 21 has a front edge 23 that is provided for engaging a latch 24 extending from a latch bar 14. Latch bar 14 has the same general shape and cross-section as top shell trip bail 4, but is shorter in axial length. Latch 24 on latch bar 14 retains latch 21 and, thus, tray 13 in the closed position (FIGS. 1 and 2). When latch bar 14 is pivoted downward about pivots 22, latch 24 moves below front edge 23 to release tray 13 in the direction indicated by arrow 25 (FIG. 9). Tray 13 is spring-driven to pop out of device 1 when actuated by latch bar 14 (FIG. 3).

Figure 10:
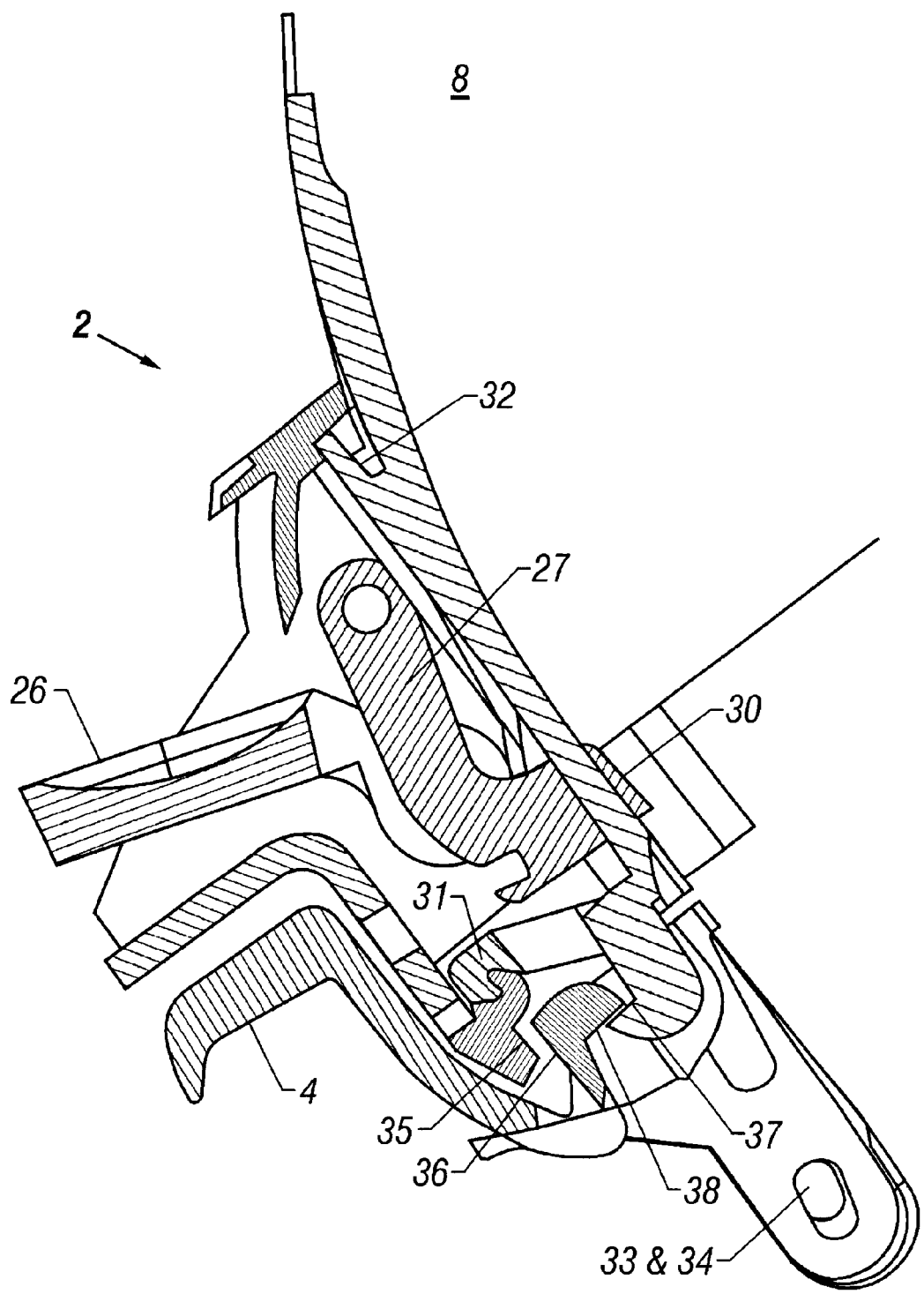
FIG. 10 is a sectional side view of a selector assembly of the compact disk storage device of FIG. 1 at a lock position.
Figure 11:
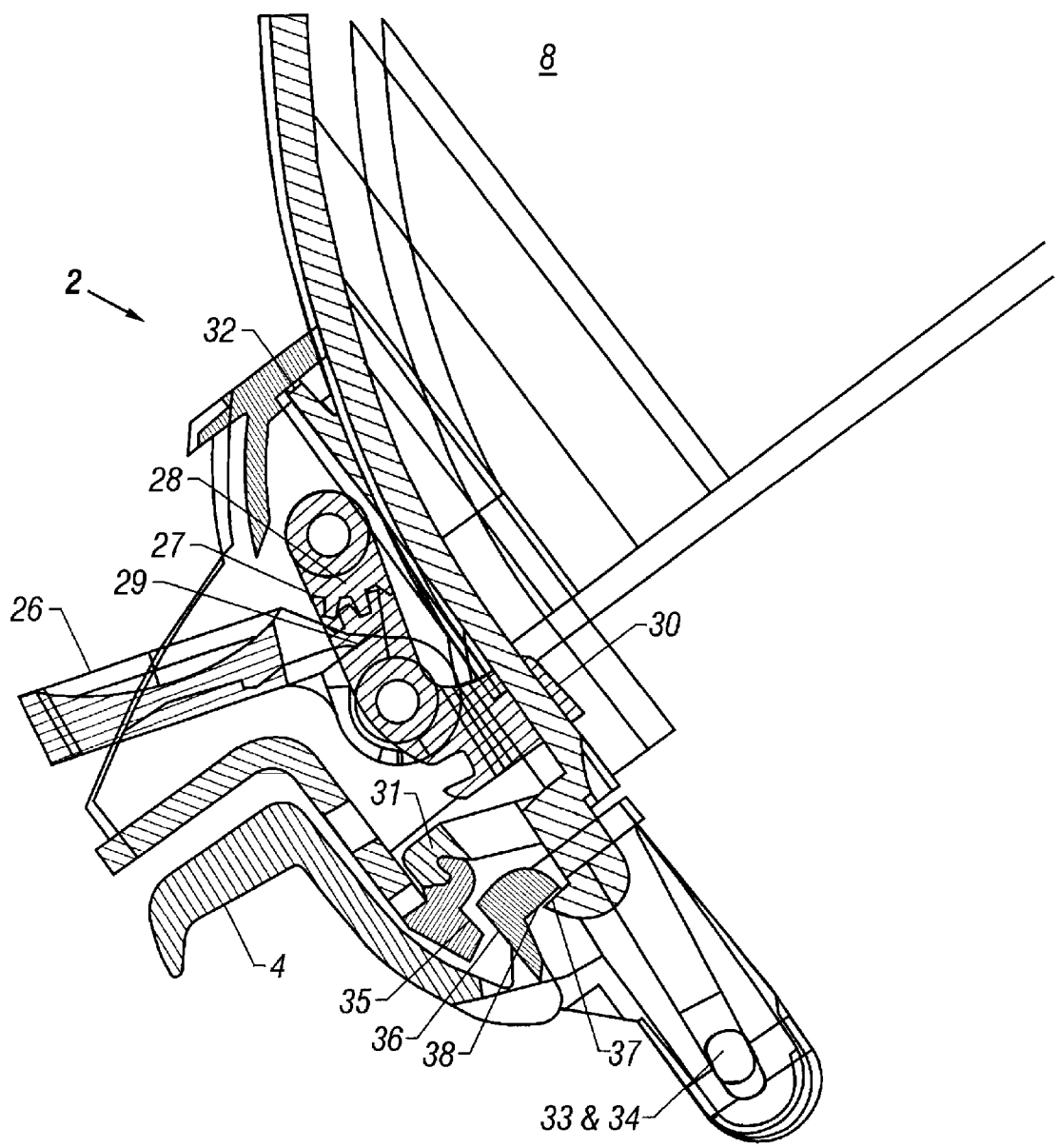
FIG. 11 is a sectional side view of a selector assembly of the compact disk storage device of FIG. 1 at a lock position but varied slightly from FIG. 10.

As shown in FIGS. 10 and 11, the selector assembly 2 may be positioned at the central or locked position 3 (see FIG. 1) to prevent lid 8 from being released to the open position. Selector assembly 2 has a pivotally mounted selector button 26 for selecting one of the CDs contained within device 1. Selector button 26 is spring-loaded with a torsion spring (not shown) and biased to the upper position shown in FIGS. 10 and 11. The lower position of FIGS. 12 and 13 will be described below. Selector button 26 is geared to a disk picker 27 via gears 28, 29. Disk picker 27 has a CD picker surface 30 for engaging the outer perimeter edges of the CDs.

Selector assembly 2 is slidable along an upper rail 32 and lower rail 31, both located in lid 8. Top shell latch bail 4 pivots about pins 33, 34 which are fixed to bottom shell or base 7. A latch surface 35 on selector assembly 2 interferes with surface 36 on bail 4 in order to prevent bail 4 from rotating counterclockwise or downward. A latch surface 37 on top shell or lid 8 interferes with latch surface 38 on bail 4, thereby preventing lid 8 from rotating to the open position. This configuration accomplishes the top shell locking function.

Figure 12:
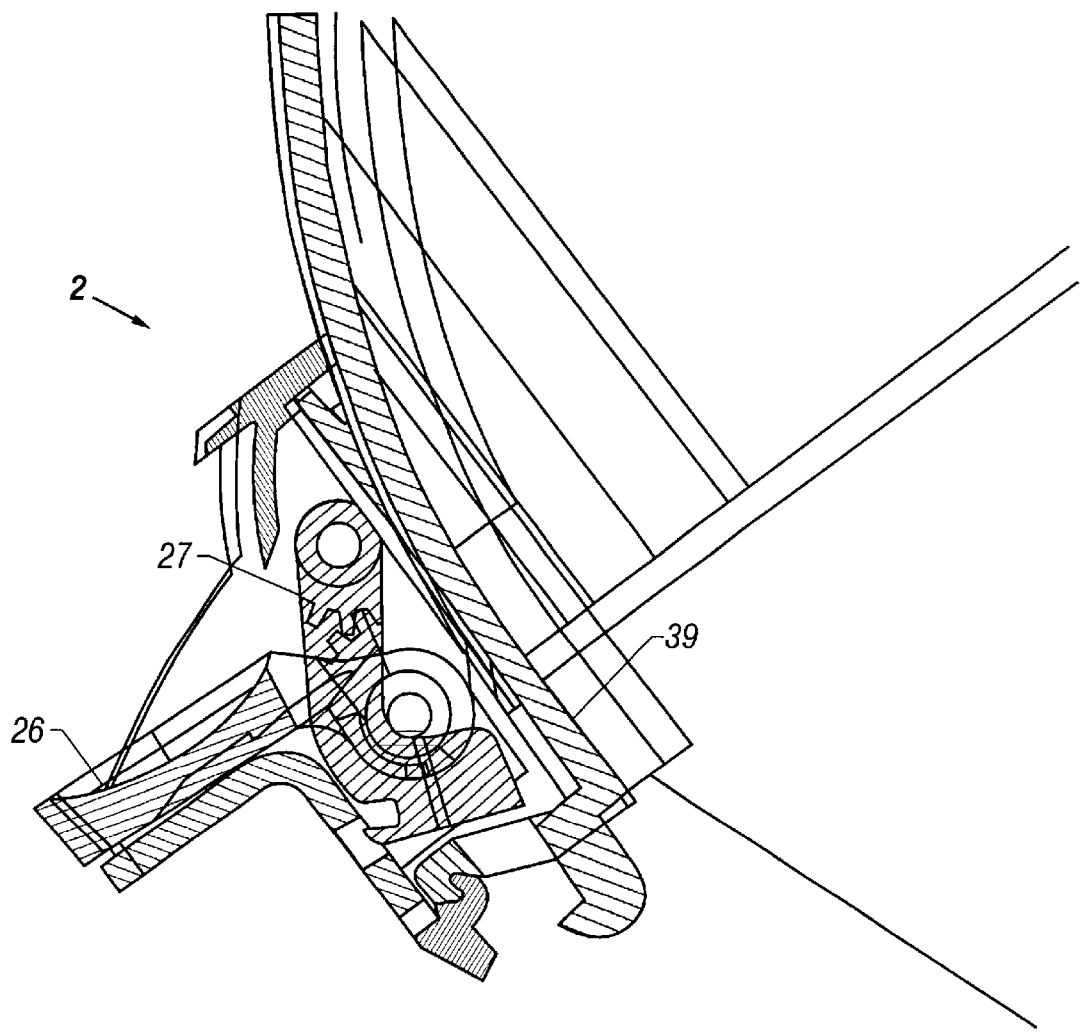
FIG. 12 is a sectional side view of the selector assembly and compact disk storage device of FIG. 10 at a sliding position.
Figure 13:
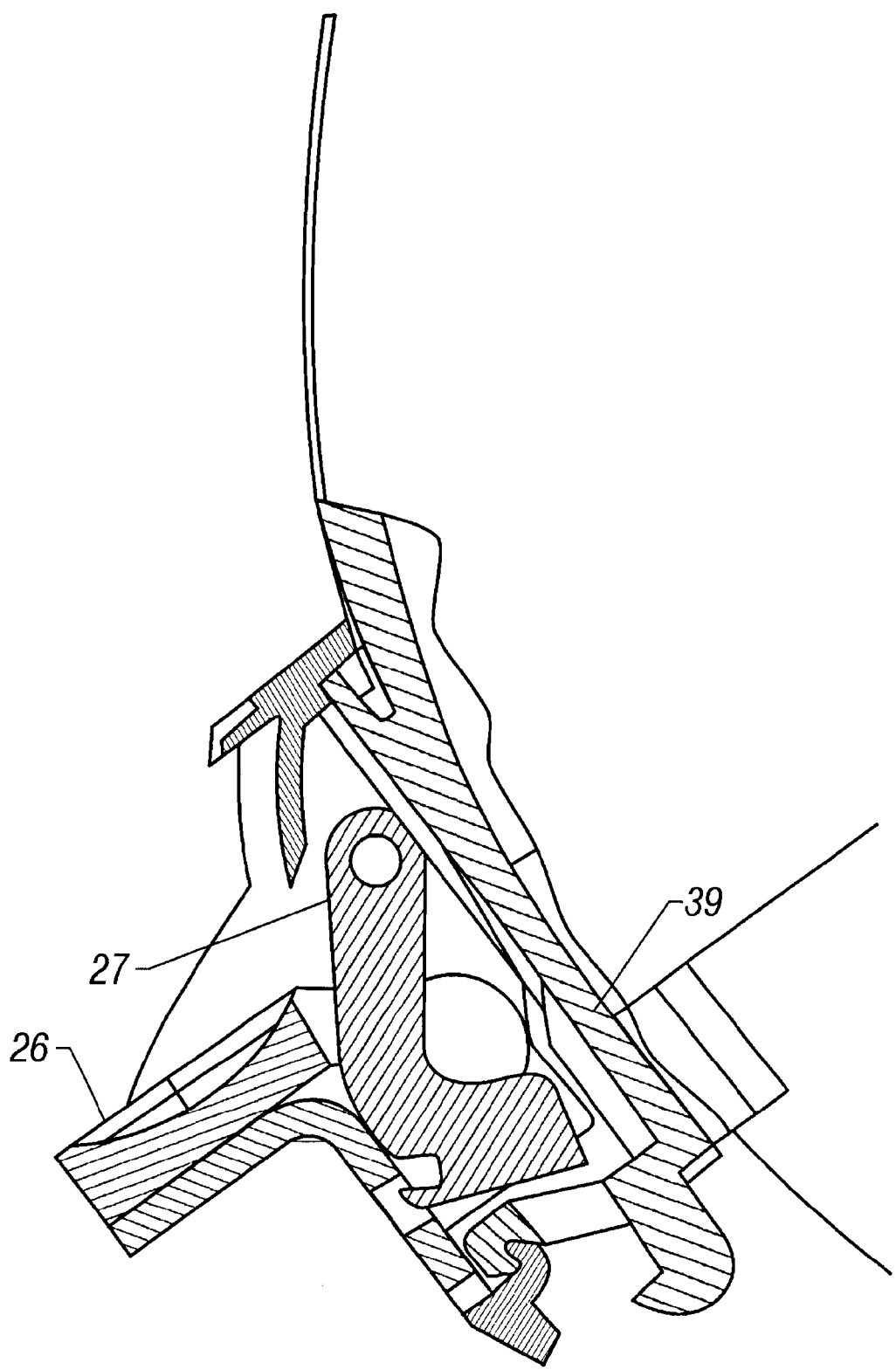
FIG. 13 is a sectional side view of the selector assembly and compact disk storage device of FIG. 10 at a sliding position that is varied slightly from FIG. 12.

Referring now to FIGS. 12 and 13, a partial sectional view of device 1 at a position other than the central locking position 3 is shown. In this position, selector button 26 has been depressed relative to the selector assembly 2 by an operator. This movement rotates disk picker 27 out of a detent rack 39, and frees the selector assembly 2 to slide on rails 31, 32 to the next desired CD selection. Moving selector assembly 2 away from the lock position 3 frees latch surface 36. Thus, selector button 26 is only inhibited by surface 36 when in the center lock position 3.

Figure 14:
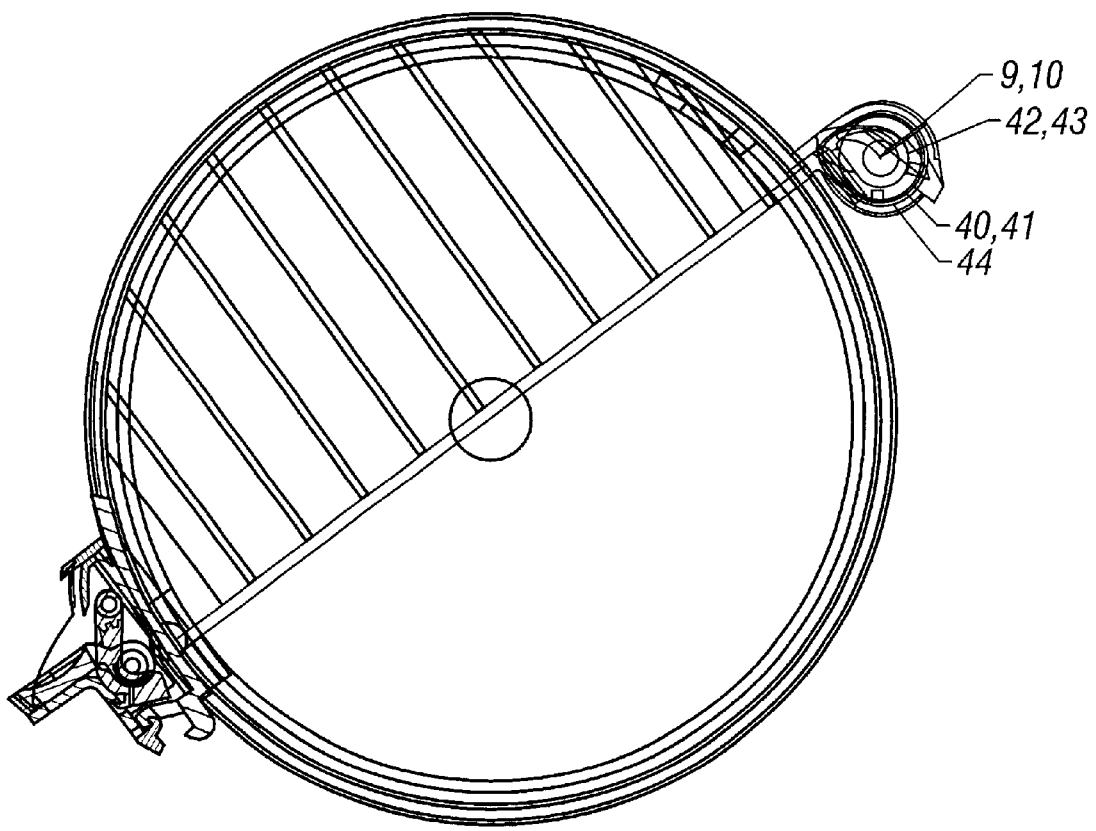
FIG. 14 is a sectional side view of the compact disk storage device of FIG. 1 showing details of the spring-loaded hinges at the rear of the device.

As shown in FIG. 14, lid 8 is pivotably movable relative to base 7 via hinges 9, 10. In the preferred embodiment, hinges 9, 10 contain torsion springs 40, 41, viscous damping hubs 42, 43, and an extremely viscous silicon grease, indicated schematically at 44. The springs 40, 41 keep an opening torque on the lid 8 and the hubs, and the grease serves to control the velocity of the shell.

In operation, the lid 8 is pivoted to the open position to provide access to the opening in base 7. Prior to insertion of a disc 16, the groove or slot in which the desire disc 16 is to be inserted is selected. The outer edge of disc 16 is placed on forward edge 7a of the selected groove between the two adjacent ribs 17, 18 (FIGS. 5–7) which define the groove. Disc 16 is then rolled rearward or dropped into the groove such that its outer edge is closely received by the adjacent pair of ribs. The ribs will cause the CD to align and seat in the groove without cross-threading into an adjacent groove. The lesser, square-topped cross-sectional dimension 18c of the rearward ribs allows the CD to seat properly in the groove without hindering its alignment. The decreasing radial dimension of the ribs facilitates the alignment of the CD therebetween. The shallow depth of the grooves prevent any portion of device 1 from contacting the recorded media on the CD. The concave is shape and the inclination of base 7 from rearward edge 7b to forward edge 7a tend to cause the CD to roll rearward and come to rest in a single groove. Rolling movement rather than dropping (straight vertical movement), tends to keep the CD in the groove.

To remove a CD located within device 1, selector assembly 2 is moved relative to lid 8 until its indicator line 12 aligns or coincides with the selected numeral of the desired CD. To move selector assembly 2 from side to side, selector button 26 until selector assembly 2 is in position. When selector button 26 is released, the desired CD is engaged by the CD picker surface 30 of disk picker 27 to essentially "pin" the selected CD in the corresponding groove in lid 8. Next, top shell latch bail 4 is depressed to release lid 8 from base 7 with the desired CD located in lid 8, and pivots about hinges 9, 10. The selected CD is then easily removed by hand from lid 8 by the user. At any time, the title sheet tray 13 may be released to the extended position in front of device 1 by latch bar 14. Latch bar 14 and, thus, title sheet tray 13 is completely independent of top shell latch bail 4 and the movement of lid 8.

The invention has several advantages. The configuration of the ribs and grooves in the base allows a compact disc to be more easily seated in a groove without having to precisely align it during insertion. The shallow grooves, combined with the stand-off, eliminate contact with the recorded media on the disc.

While the invention has been shown or described in only some of its forms, it should be apparent to those skilled in the art that it is not so limited, but is susceptible to various changes without departing from the scope of the invention.

What is claimed is:

1. An apparatus for holding disks, comprising:
    a base having a front edge, a rear edge, a generally upward-facing opening, a partially cylindrical inner surface and a longitudinal axis;
    a plurality of symmetrically spaced apart, parallel ribs on the inner surface of the base, each of the ribs extending substantially from the front edge to the rear edge and being perpendicular to the axis of the base, and each of the ribs having a radial dimension; and wherein
    the radial dimension of each of the ribs is less in a rearward portion adjacent to the rear edge than at a forward portion adjacent to the front edge for facilitating the alignment of a disk between an adjacent pair of the ribs as the disk is inserted between the adjacent pair of ribs.

2. The apparatus of claim 1 wherein the radial dimension of each of the ribs is tapered between the forward portion and the rearward portion.

3. The apparatus of claim 1 wherein each of the ribs in the forward portion is chamfered to create a sharp upper edge, and each of the ribs in the rearward portion has a blunt upper edge.

4. The apparatus of claim 1 wherein each of the ribs has a cross-sectional shape which has a sharp profile near the front edge, a blunt profile in the rear portion, and is tapered therebetween.

5. The apparatus of claim 1, further comprising a lid pivotally mounted to the base, wherein the lid has a plurality of ribs that align with the ribs in the base.

6. The apparatus of claim 5 wherein the lid is mounted to the base on hinges having torsion springs and a viscous silicon grease for controlling a velocity of the lid relative to the base.

7. The apparatus of claim 1, further comprising selection means for selecting a disk located in the apparatus.

8. The apparatus of claim 7 wherein the selection means comprises a selector assembly having a pivotable selector button with a disk picker that is adapted to engage a perimeter edge of the disk.

9. The apparatus of claim 1, further comprising a title sheet tray movably mounted to the base for supporting a title sheet.

10. The apparatus of claim 9 wherein the title sheet tray has a pair of gear racks for engaging pinions mounted to the base, and a release mechanism for releasing the title sheet tray to a position located in front of the base.

11. An apparatus for holding disks, comprising:
    a base having a longitudinal axis, a front edge, a rear edge, a generally upward-facing opening, and a partially cylindrical inner surface, the base having a lower support which positions the front edge at a lower elevation than the rear edge, the inner surface having a forward portion and a rearward portion which extends forward from the rear edge;
    a plurality of symmetrically spaced apart, parallel ribs on the inner surface of the base, each of the ribs being perpendicular to the axis of the base, each of the ribs in the forward portion of the inner surface having a radial dimension, and the rearward portion of the inner surface being free of any ribs which have a radial dimension equal to or greater than the radial dimension of the ribs in the forward portion;
    a lid hinged to the rear edge of the base and having ribs on an inner partially cylindrical surface which align with the ribs in the base; and
    selection means mounted to the lid for selecting a disk located in the apparatus.

12. The apparatus of claim 11 wherein the ribs extend into the rearward portion of the inner surface, and wherein the radial dimension of the ribs is tapered between the forward and rearward portions in a direction toward the rear edge.

13. The apparatus of claim 11 wherein each of the ribs in the forward portion of the inner surface near the front edge are chamfered to create a-sharp upper edge.

14. The apparatus of claim 11 wherein the lid is mounted to the base on hinges having torsion springs and a viscous silicon grease for controlling a velocity of the lid relative to the base.

15. The apparatus of claim 11 wherein the selection means comprises a selector assembly having a pivotable selector button with a disk picker that is adapted to engage a perimeter edge of the disk.

16. The apparatus of claim 11, further comprising a title sheet tray movably mounted to the base for supporting a title sheet.

17. The apparatus of claim 16 wherein the title sheet tray has a pair of gear racks for engaging pinions mounted to the base, and a release mechanism for releasing the title sheet tray to a position located in front of the base.

18. An apparatus for holding disks, comprising:

a base having a longitudinal axis, a front edge, a rear edge, a generally upward-facing opening, and a partially cylindrical inner surface, the base having a lower support which positions the front edge at a lower elevation than the rear edge, the inner surface having a forward portion and a rearward portion which extends forward from the rear edge;

a plurality of symmetrically spaced apart, parallel ribs on the inner surface of the base, each of the ribs being perpendicular to the axis of the base, each of the ribs in the forward portion of the inner surface having a radial dimension, and the rearward portion of the inner surface being free of any ribs which have a radial dimension equal to or greater than the radial dimension of the ribs in the forward portion;

a lid hinged to the rear edge of the base and having ribs on an inner partially cylindrical surface which align with the ribs in the base;

selection means mounted to the lid for selecting a disk located in the apparatus, the selection means comprising a selector assembly having a pivotable selector button with a disk picker that is adapted to engage a perimeter edge of the disk; wherein the ribs extend into the rearward portion of the inner surface, the radial dimension of the ribs is tapered between the forward and rearward portions in a direction toward the rear edge, and wherein each of the ribs in the forward portion of the inner surface near the front edge are chamfered to create a sharp upper edge.

19. The apparatus of claim 18 wherein the lid is mounted to the base on hinges having torsion springs and a viscous silicon grease for controlling a velocity of the lid relative to the base.

20. The apparatus of claim 18, further comprising a title sheet tray movably mounted to the base for supporting a title sheet, wherein the title sheet tray has a pair of gear racks for engaging pinions mounted to the base, and a release mechanism for releasing the title sheet tray to a position located in front of the base.

* * * * *

UNITED STATES PATENT AND TRADEMARK OFFICE
CERTIFICATE OF CORRECTION

PATENT NO.    : 6,386,655 B1
DATED         : May 14, 2002
INVENTOR(S)   : Hunt et al.

It is certified that error appears in the above-identified patent and that said Letters Patent is hereby corrected as shown below:

<u>Title page,</u>
Item [12], the lead inventor's name is incorrectly cited, replace "Hung et al." with
-- Hunt et al. --

Item [75], the lead inventor's name is incorrectly cited replace "Ronald Eugene Hung"
with -- Ronald Eugene Hunt --.

Signed and Sealed this

Twenty-third Day of July, 2002

*Attest:*

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO.    : 6,386,655 B1
DATED         : May 14, 2002
INVENTOR(S)   : Hunt et al.

It is certified that error appears in the above-identified patent and that said Letters Patent is hereby corrected as shown below:

<u>Title page,</u>
Item [12], United States Patent, please replace "Hung et al." with -- Hunt et al. --
Item [75], Inventors, replace "Ronald Eugene Hung" with -- Ronald Eugene Hunt --.

Signed and Sealed this

Twenty-sixth Day of July, 2005

JON W. DUDAS
*Director of the United States Patent and Trademark Office*